United States Patent
Xue et al.

(10) Patent No.: US 12,468,932 B2
(45) Date of Patent: Nov. 11, 2025

(54) AUTOMATED END-TO-END MACHINE LEARNING MODEL OPTIMIZATION

(71) Applicant: International Business Machines Corporation, Armonk, NY (US)

(72) Inventors: Chao Xue, Beijing (CN); Chang Xu, Beijing (CN); Yu Ling Zheng, Beijing (CN); Leonid Karlinsky, Mazkeret Batya (IL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1093 days.

(21) Appl. No.: 17/137,588

(22) Filed: Dec. 30, 2020

(65) Prior Publication Data

US 2022/0207350 A1 Jun. 30, 2022

(51) Int. Cl.
G06N 3/08 (2023.01)
G06N 3/045 (2023.01)
G06N 3/047 (2023.01)
G06N 20/00 (2019.01)

(52) U.S. Cl.
CPC .............. *G06N 3/08* (2013.01); *G06N 3/047* (2023.01); *G06N 20/00* (2019.01)

(58) Field of Classification Search
CPC .......... G06N 3/08; G06N 3/047; G06N 20/00; G06N 3/045
See application file for complete search history.

(56) References Cited

U.S. PATENT DOCUMENTS 10,853,726 B2 * 12/2020 Zoph .................. G06N 3/045

FOREIGN PATENT DOCUMENTS

| CN | 110598788 A | 12/2019 | |
|---|---|---|---|
| CN | 111291739 A | 6/2020 | |
| CN | 111401517 A * | 7/2020 | ........... G06F 18/241 |

OTHER PUBLICATIONS

Authors: Xu et al. Title: Auto-FPN: Automatic Network Architecture Adaptation for Object Detection Beyond Classification Publication Date: Feb. 27, 2020 (Year: 2020).*

(Continued)

*Primary Examiner* — Luis A Sitiriche
*Assistant Examiner* — Amy Tran
(74) *Attorney, Agent, or Firm* — Garg Law Firm, PLLC; Rakesh Garg; Jared Chaney

(57) ABSTRACT

Using a training portion of a dataset, a set of component parameters comprising parameters of a component of an object detection model are trained. Using the trained set of component parameters, a set of backbone component weights comprising weights of component types in a backbone portion of the object detection model are trained. Using the trained set of component parameters, a set of backbone link weights comprising weights of links within the backbone portion are trained. Using the trained set of component parameters, a set of head component weights comprising weights of component types in a head portion of the object detection model are trained. Using the trained sets of component parameters, backbone component weights, backbone link weights, and head component weights, a trained object detection model is configured and trained to perform object detection.

20 Claims, 11 Drawing Sheets

(56) References Cited

OTHER PUBLICATIONS

Authors: Chen et al. Title: DetNAS: Backbone Search for Object Detection Publication Date: Dec. 30, 2019 (Year: 2019).*
Authors: Tayara & Chong Title: Object Detection in Very High-Resolution Aerial Images Using One-Stage Densely Connected Feature Pyramid Network Publication Date: Oct. 6, 2018 (Year: 2018).*
Authors: Liu & Tang Title: BFBox: Searching Face-appropriate Backbone and Feature Pyramid Network for Robust Face Detector Publication date: Aug. 5, 2020 (Year: 2020).*
Yao et al., SM-NAS: Structural-to-Modular Neural Architecture Search for Object Detection, The Thirty-Fourth AAAI Conference on Artificial Intelligence (AAAI-20), Nov. 30, 2019.
Wang et al., NAS-FCOS: Fast Neural Architecture Search for Object Detection, 2020.
Zhou et al., Objects as Points, Apr. 25, 2019.

\* cited by examiner

AUTOMATED END-TO-END MACHINE LEARNING MODEL OPTIMIZATION

BACKGROUND

The present invention relates generally to a method, system, and computer program product for automated machine learning modeling optimization. More particularly, the present invention relates to a method, system, and computer program product for automated end-to-end machine learning model optimization.

In most machine learning implementations, a human developer selects a model architecture, configures parameters of a specific model of the selected architecture based on the data the model will process, and selects appropriate model training and validation data. Configuring parameters of a specific model includes determining the number, type, arrangement, and size of components of the model, as well as training parameters and validation criteria for the model. Some non-limiting examples of model components are a skip layer, convolution layers of various sizes, and maximum and average pooling layers. Some non-limiting examples of component arrangements are a parallel configuration of a set of components and a series configuration of a set of components. Once configured, the model is trained, validated, and deployed. In some implementations, model training and validation continues even after the model is initially deployed.

However, there are many model types and configurations that could be used for a particular application. To select an optimal model type and model parameters, a human developer would have to evaluate multiple configurations using task-appropriate training and validation data. However, it is difficult for even an experienced human developer to determine which configurations to evaluate or perform an exhaustive evaluation, particularly when implementing machine learning for a task or data type that is new to the developer. In addition, a human developer will often select a model configuration that is good enough to meet a set of criteria, without determining that the configuration is optimal.

Automated machine learning aims to reduce or eliminate the need for a skilled human developer, by accepting labeled training data as input, automatically selecting a model architecture, configuring and training a specific model, and generating a trained, optimized model. The illustrative embodiments recognize that one method of generating a trained, optimized model is to configure and train every possible model permutation on the data and select the model that performs best. However, for all but the very smallest model types and datasets, configuring, training, and evaluating every possible model requires too much computing time and is thus too time consuming, expensive, or both.

The illustrative embodiments recognize that another method of generating a trained, optimized model is to divide a model architecture into portions, configure and train every possible permutation of each portion, select each best-performing portions, and assemble the configured and trained portions together into a complete model. For example, many models used for object detection within images have three main sections: a backbone network that extracts features from an image, a feature network (often implemented as a feature pyramid network (FPN)) that takes multiple levels of features from the backbone as input and outputs a list of fused features representing salient characteristics of the image, and a final class, box, or head network that uses the fused features to predict the class and location of each object in the image. Presently available techniques search for an optimal backbone network configuration using an evolution algorithm or a differential method, search for an optimal FPN configuration using reinforcement learning or a differential method, and search for an optimal head configuration using various learning methods. Configuring, training, and evaluating portions of a model requires less computing time than evaluating an entire model, but does not evaluate interactions between portions. For example, presently available techniques for use on object detection models produce an optimal backbone network, FPN, and head network, but do not evaluate interactions between the backbone, FPN, and head. As a result, models evaluated in portions might not perform as well as possible.

Consequently, the illustrative embodiments recognize that what is needed in the art is an improved method of configuring, training, and evaluating machine learning models on an overall, end-to-end basis, without requiring so much computing time as to make use of the method too time consuming, expensive, or both.

SUMMARY

The illustrative embodiments provide a method, system, and computer program product. An embodiment includes a method that trains, using a training portion of a dataset, a set of component parameters, the set of component parameters comprising parameters of a component of an object detection model. An embodiment trains, using the trained set of component parameters and a first portion of a validation portion of the dataset, a set of backbone component weights, a backbone component weight in the set of backbone component weights comprising a weight of a component type in a backbone portion of the object detection model. An embodiment trains, using the trained set of component parameters and a second portion of the validation portion of the dataset, a set of backbone link weights, a backbone link weight within the set of backbone link weights comprising a weight of a link within the backbone portion of in the object detection model. An embodiment trains, using the trained set of component parameters and a third portion of the validation portion of the dataset, a set of head component weights, a head component weight in the set of head component weights comprising a weight of a component type in a head portion of the object detection model. An embodiment configures, using the trained set of component parameters, the trained set of backbone component weights, the trained set of backbone link weights, and the trained set of head component weights, a trained object detection model. An embodiment causes the trained object detection model to perform object detection. Thus, an embodiment provides a method of automated end-to-end machine learning model optimization.

Another embodiment initializes, to a set of pseudorandom values having a normal distribution, the set of component parameters, the set of backbone component weights, the set of backbone link weights, and the set of head component weights. Thus, the embodiment initializes parameters for training and configuring an optimized automated end-to-end machine learning model optimization.

In another embodiment, training the set of component parameters is performed using a stochastic training descent method. Thus, the embodiment performs end-to-end machine learning model optimization using a stochastic training descent method.

In another embodiment, the trained set of component parameters, the set of backbone link weights, and the set of head component weights are held constant during training of the set of backbone component weights. Thus, the embodiment trains the set of backbone component weights while holding other parameters constant during end-to-end machine learning model optimization.

In another embodiment, the trained set of component parameters, the set of backbone component weights, and the set of head component weights are held constant during training of the set of backbone link weights. Thus, the embodiment trains the set of backbone link weights while holding other parameters constant during end-to-end machine learning model optimization.

In another embodiment, the trained set of component parameters, the set of backbone component weights, and the set of backbone link weights are held constant during training of the set of head component weights. Thus, the embodiment trains the set of head component weights while holding other parameters constant during end-to-end machine learning model optimization.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
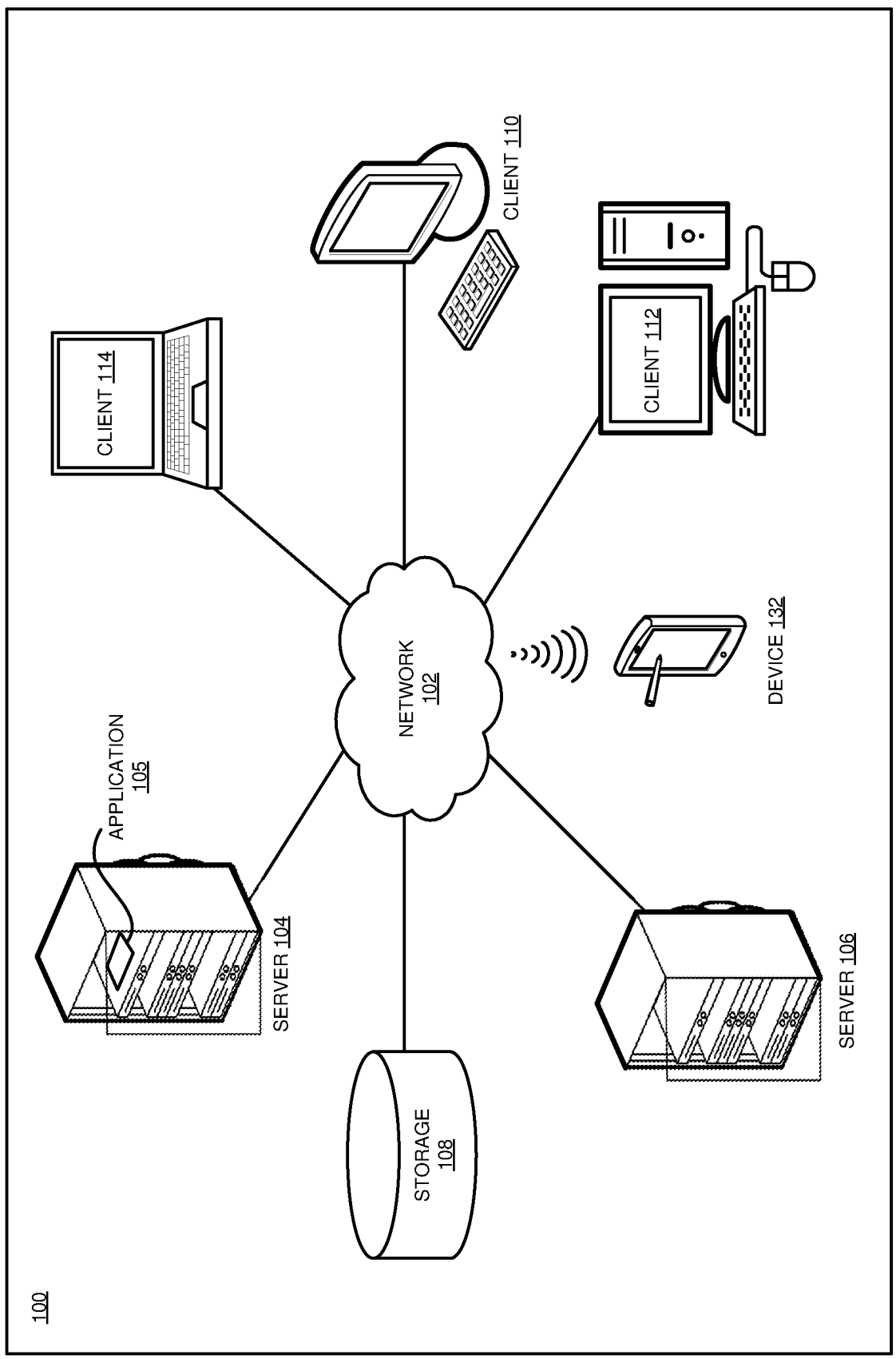
FIG. 1 depicts a block diagram of a network of data processing systems in which illustrative embodiments may be implemented.

The illustrative embodiments recognize that what is needed in the art is an improved method of configuring, training, and evaluating machine learning models on an overall, end-to-end basis, without requiring so much computing time as to make use of the method too time consuming, expensive, or both. The illustrative embodiments recognize that the presently available tools or solutions do not address these needs or provide adequate solutions for these needs. The illustrative embodiments used to describe the invention generally address and solve the above-described problems and other problems related to automated end-to-end machine learning model optimization.

An embodiment can be implemented as a software application. The application implementing an embodiment can be configured as a modification of an existing machine learning modelling system, as a separate application that operates in conjunction with an existing machine learning modelling system, a standalone application, or some combination thereof.

Particularly, some illustrative embodiments provide a method that uses a training portion of a dataset to train a set of component parameters of a model. The method uses the trained set of component parameters and a first portion of a validation portion of the dataset to train a set of component weights comprising weights of component types in a portion of the model, uses the trained set of component parameters and a second portion of a validation portion of the dataset to train a set of link weights comprising weights of links in the portion of the model, and uses the trained set of component parameters and a third portion of a validation portion of the dataset to train a set of component weights comprising weights of component types in a second portion of the model. The method configures a trained model using the trained set of component parameters, the first trained set of component weights, the trained set of link weights, and the second trained set of head component weights, and uses the trained model to perform the functionality for which the model was trained.

An embodiment begins with a generic model architecture to be configured and trained. The generic model architecture includes a set of components, and each component can be of one or more possible types. Each component also has a set of parameters defining properties of a particular component. The generic model architecture also includes a set of links between components. The embodiment's task is to configure one or more sets of component weights (i.e. a weight, or importance, of a particular type of component within a particular spot in the generic architecture), component parameters, and link weights i.e. a weight, or importance, of a particular link between components in the generic architecture).

For example, a generic model architecture for object detection within images has three main sections: a backbone network, FPN, and head network. One example configuration of the backbone network is a u-net configuration. A u-net configuration is an architecture in which the size, or resolution, of feature map components of the architecture decreases and then increases. Each component in the u-net configuration has one or more possible types, for example a skip layer and one or more convolution layers of various sizes. Thus, each possible type for a particular backbone component has a corresponding backbone component weight. Some links within the u-net configuration are optional. Thus, an optional link within the u-net has a corresponding backbone link weight. Alternatively, all links within the u-net configuration have corresponding backbone link weights, but weights corresponding to non-optional links are set to a constant (e.g., one if the weights use a 0-1 scale) and not adjustable. Each component in the head network also has one or more possible types, for example a skip layer, one or more convolution layers of various sizes, and maximum and average pooling layers. Thus, each possible type for a particular head component has a corresponding head component weight. Each component also has a set of parameters defining properties of a particular component. For example, a 3×3 convolution layer might include a matrix of weight values, set during model training, defining the specific convolution operation this 3×3 convolution layer performs. Thus, the set of component parameters for this particular 3×3 convolution layer includes the matrix of weight values set during model configuration and training.

An embodiment initializes the component parameters, component weights, and link weights to suitable starting values. One embodiment initializes the set of component parameters, the set of link weights, and each set of component weights to sets of pseudorandom values. In one embodiment, each set of pseudorandom values has a normal distribution. Another embodiment initializes the set of component parameters, the set of link weights, and each set of component weights to sets of values previously found to be useful starting points for model searching and training. Other starting values are also possible and the same are contemplated within the scope of the illustrative embodiments. In particular, when configuring and training an example generic model architecture for object detection, an embodiment initializes the set of component parameters, the set of backbone component weights, the set of backbone link weights, and the set of head component weights to a set of pseudorandom values having a normal distribution, An embodiment receives training data with which to configure and train the desired model. The embodiment divides the training data into a model training portion and a model validation portion. The embodiment further divides the validation portion into a portion to be used to determine a set of link weights and separate portions to be used to determine each set of component weights. In particular, when configuring and training an example generic model architecture for object detection, an embodiment divides the validation portion of the dataset into three portions, one each for determining the set of backbone component weights, the set of backbone link weights, and the set of head component weights.

With the sets of component weights and link weights held constant, an embodiment uses the training portion of the dataset to train the set of component parameters. One embodiment uses a stochastic gradient descent based technique to iteratively update the set of component parameters until a difference between parameter values resulting from successive is less than a predetermined threshold. Stochastic gradient descent is a presently available iterative method for optimizing an objective function with particular smoothness properties. Other techniques for updating the set of component parameters and determining a training endpoint are also possible and contemplated within the scope of the illustrative embodiments.

An embodiment uses a validation portion of the dataset to train a set of component weights while holding the updated set of component parameters, the set of link weights, and other sets of component weights, if any, constant. One embodiment uses a stochastic gradient descent based technique to iteratively update the set of component weights until a predetermined stopping point is reached. Other techniques for updating the set of component weights are also possible and contemplated within the scope of the illustrative embodiments. In particular, when configuring and training an example generic model architecture for object detection, an embodiment uses a validation portion of the dataset and a stochastic gradient descent based technique to update the set of backbone component weights while holding the updated set of component parameters, the set of backbone link weights, and the set of head component weights constant.

An embodiment uses another validation portion of the dataset to train another set of component weights while holding the updated set of component parameters, the set of link weights, and other sets of component weights, if any, constant. One embodiment uses a stochastic gradient descent based technique to iteratively update the set of component weights until a predetermined stopping point is reached. Other techniques for updating the set of component weights are also possible and contemplated within the scope of the illustrative embodiments. In particular, when configuring and training an example generic model architecture for object detection, an embodiment uses a validation portion of the dataset and a stochastic gradient descent based technique to update the set of head component weights while holding the updated set of component parameters, the set of backbone link weights, and the set of backbone component weights constant. If there are additional sets of component weights to be updated, an embodiment uses another validation portion of the dataset to train additional sets of component weights while holding the updated set of component parameters, the set of link weights, and other sets of component weights, if any, constant in a manner described herein.

An embodiment uses another validation portion of the dataset to train the set of link weights while holding the updated set of component parameters and the sets of component weights, if any, constant. One embodiment uses a stochastic gradient descent based technique to iteratively update the set of link weights until a predetermined stopping point is reached. Other techniques for updating the set of link weights are also possible and contemplated within the scope of the illustrative embodiments. In particular, when configuring and training an example generic model architecture for object detection, an embodiment uses a validation portion of the dataset and a stochastic gradient descent based technique to update the set of backbone link weights while holding the updated set of component parameters, the set of backbone component weights, and the set of head component weights constant. If there are additional sets of link weights to be updated, an embodiment uses another validation portion of the dataset to train additional sets of link weights while holding the updated set of component parameters, the sets of component weights, and other sets of link weights, if any, constant in a manner described herein.

An embodiment need not update sets of component and link weights in any particular order, and need not update each set of component and link weights. In addition, one embodiment updates sets of component and link weights in series, while another embodiment updates sets of component and link weights in parallel.

Once one or more of the sets of component and link weights have been updated, an embodiment evaluates the current state of the model being generated. In one embodiment, if the model has an accuracy, with respect to the validation dataset, below a threshold, the model needs further updates. In another embodiment, if the model has a loss, with respect to the validation dataset, above a threshold, the model needs further updates. If the model needs further updates, an embodiment re-divides the input training data into a model training portion and a model validation portion, re-divides the new validation portion into a portion to be used to determine a set of link weights and separate portions to be used to determine each set of component weights, and uses the new portions to further update the set of component parameters and one or more of the sets of component and link weights in a manner described herein.

If an embodiment determines that the model does not need further updates, the embodiment configures the model using the trained set of component parameters, the first trained set of component weights, the trained set of link weights, and the second trained set of component weights. In particular, the trained model incorporates the highest weighted component type for each component, and the link weight with the highest weight for each link. An embodiment uses the trained model to perform the functionality for which the model was trained. In particular, when configuring and training an example generic model architecture for object detection, an embodiment configures the model using the trained set of component parameters, the set of backbone component weights, the set of backbone link weights, and the set of head component weights, then uses the now configured and trained object detection model to perform object detection.

The manner of automated end-to-end machine learning model optimization described herein is unavailable in the presently available methods in the technological field of endeavor pertaining to machine learning models. A method of an embodiment described herein, when implemented to execute on a device or data processing system, comprises substantial advancement of the functionality of that device or data processing system in using a training portion of a dataset to train a set of component parameters of a model, using the trained set of component parameters and a first portion of a validation portion of the dataset to train a set of component weights comprising weights of component types in a portion of the model, using the trained set of component parameters and a second portion of a validation portion of the dataset to train a set of link weights comprising weights of links in the portion of the model, using the trained set of component parameters and a third portion of a validation portion of the dataset to train a set of component weights comprising weights of component types in a second portion of the model, configuring a trained model using the trained set of component parameters, the first trained set of component weights, the trained set of link weights, and the second trained set of head component weights, and using the trained model to perform the functionality for which the model was trained.

The illustrative embodiments are described with respect to certain types of model architectures, component types, component links, component parameters, backbone and neck portions, weights, parameter and weight update methods, thresholds, update completion criteria, adjustments, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
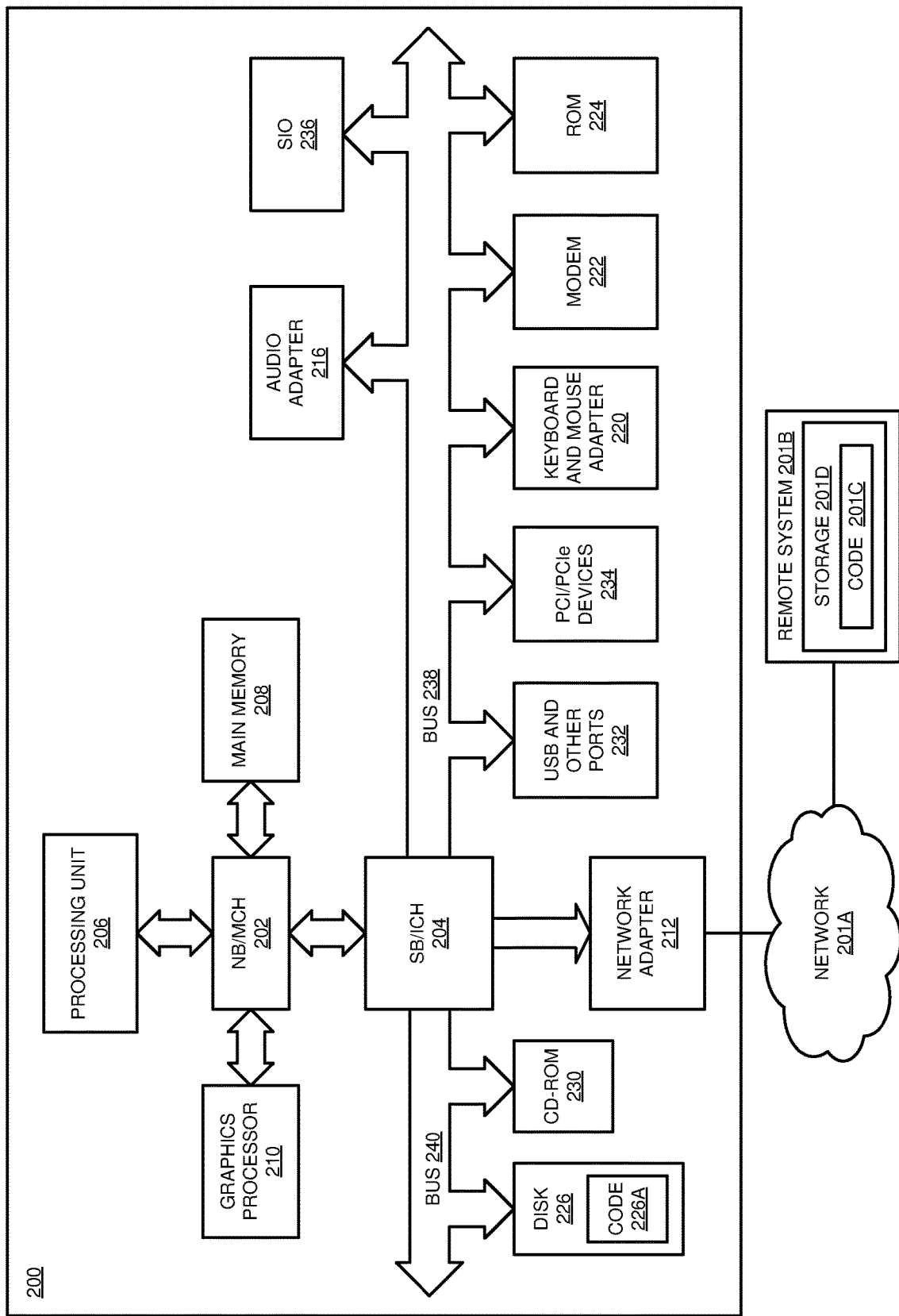
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
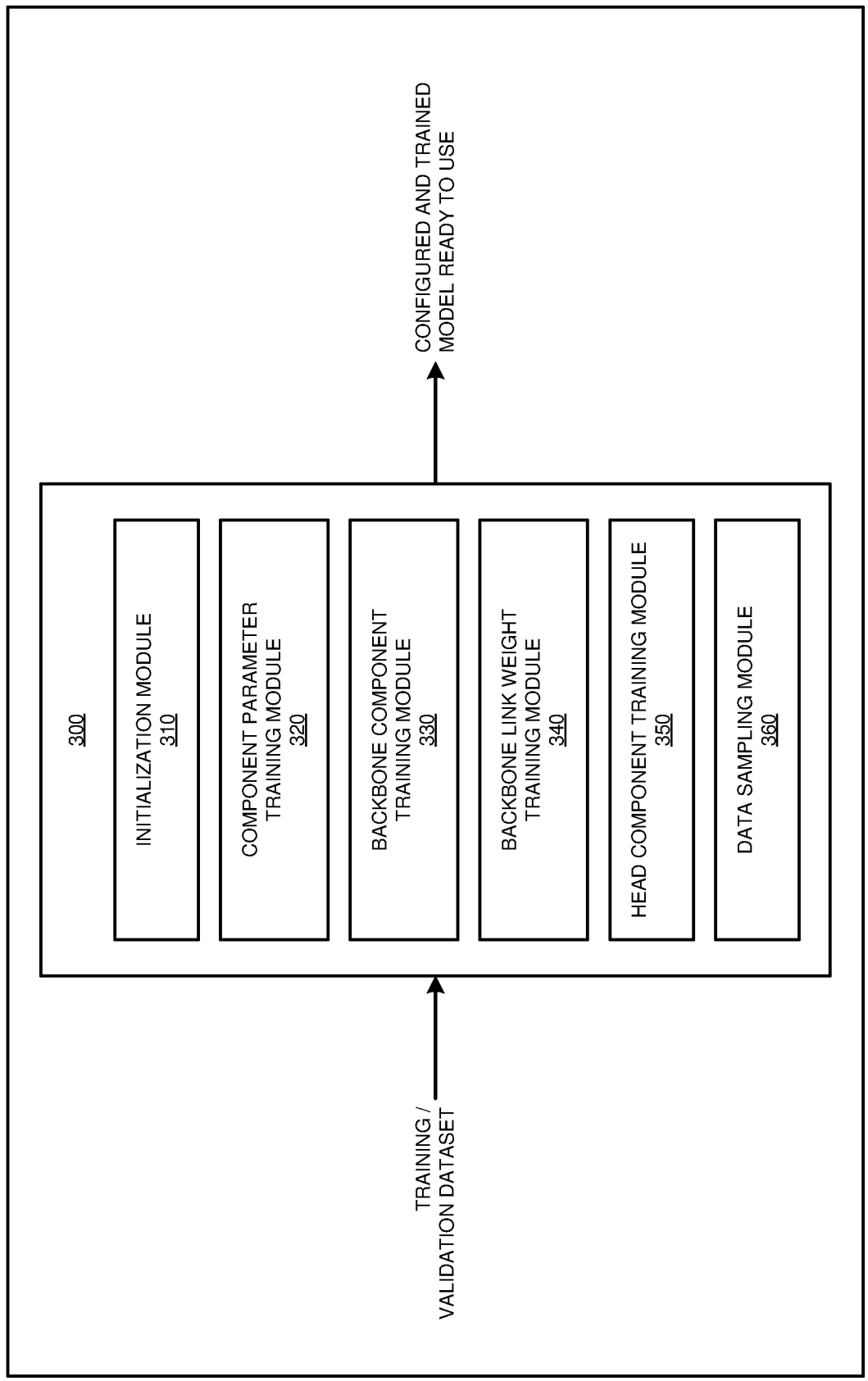
FIG. 3 depicts a block diagram of an example configuration for automated end-to-end machine learning model optimization in accordance with an illustrative embodiment.

With reference to FIG. 3, this figure depicts a block diagram of an example configuration for automated end-to-end machine learning model optimization in accordance with an illustrative embodiment. Application 300 is an example of application 105 in FIG. 1 and executes in any of servers 104 and 106, clients 110, 112, and 114, and device 132 in FIG. 1.

Application 300 begins with a generic model architecture to be configured and trained. The generic model architecture includes a set of components, and each component can be of one or more possible types. Each component also has a set of parameters defining properties of a particular component. The generic model architecture also includes a set of links between components. The embodiment's task is to configure one or more sets of component weights (i.e. a weight, or importance, of a particular type of component within a particular spot in the generic architecture), component parameters, and link weights i.e. a weight, or importance, of a particular link between components in the generic architecture).

Initialization module 310 initializes the component parameters, component weights, and link weights to suitable starting values. One implementation of module 310 initializes the set of component parameters, the set of link weights, and each set of component weights to sets of pseudorandom values. In one implementation of module 310, each set of pseudorandom values has a normal distribution. Another implementation of module 310 initializes the set of component parameters, the set of link weights, and each set of component weights to sets of values previously found to be useful starting points for model searching and training. Other implementations of module 310 use other starting values.

Data sampling module 360 receives training data with which to configure and train the desired model. Module 360 divides the training data into a model training portion and a model validation portion. Module 360 further divides the validation portion into a portion to be used to determine a set of link weights and separate portions to be used to determine each set of component weights.

With the sets of component weights and link weights held constant, component parameter training module 320 uses the training portion of the dataset to train the set of component parameters. One implementation of module 320 uses a stochastic gradient descent based technique to iteratively update the set of component parameters until a difference between parameter values resulting from successive is less than a predetermined threshold.

Backbone component training module 330 uses a validation portion of the dataset to train a set of component weights while holding the updated set of component parameters, the set of link weights, and other sets of component weights, if any, constant. One implementation of module 330 uses a stochastic gradient descent based technique to iteratively update the set of component weights until a predetermined stopping point is reached. In particular, when configuring and training an example generic model architecture for object detection, module 330 uses a validation portion of the dataset and a stochastic gradient descent based technique to update the set of backbone component weights while holding the updated set of component parameters, the set of backbone link weights, and the set of head component weights constant.

Head component training module 350 uses another validation portion of the dataset to train another set of component weights while holding the updated set of component parameters, the set of link weights, and other sets of component weights, if any, constant. One implementation of module 350 uses a stochastic gradient descent based technique to iteratively update the set of component weights until a predetermined stopping point is reached. In particular, when configuring and training an example generic model architecture for object detection, module 350 uses a validation portion of the dataset and a stochastic gradient descent based technique to update the set of head component weights while holding the updated set of component parameters, the set of backbone link weights, and the set of backbone component weights constant. If there are additional sets of component weights to be updated, application 300 uses another validation portion of the dataset to train additional sets of component weights while holding the updated set of component parameters, the set of link weights, and other sets of component weights, if any, constant in a manner described herein.

Backbone link weight training module 340 uses another validation portion of the dataset to train the set of link weights while holding the updated set of component parameters and the sets of component weights, if any, constant. One implementation of module 340 uses a stochastic gradient descent based technique to iteratively update the set of link weights until a predetermined stopping point is reached. In particular, when configuring and training an example generic model architecture for object detection, module 340 uses a validation portion of the dataset and a stochastic gradient descent based technique to update the set of backbone link weights while holding the updated set of component parameters, the set of backbone component weights, and the set of head component weights constant. If there are additional sets of link weights to be updated, module 340 uses another validation portion of the dataset to train additional sets of link weights while holding the updated set of component parameters, the sets of component weights, and other sets of link weights, if any, constant in a manner described herein.

Modules 330, 340, and 350 need not update sets of component and link weights in any particular order, and need not update each set of component and link weights. In addition, one implementation of application 300 updates sets of component and link weights in series, while another implementation of application 300 updates sets of component and link weights in parallel.

Once one or more of the sets of component and link weights have been updated, application 300 evaluates the current state of the model being generated. If the model needs further updates, data sampling module 360 re-divides the input training data into a model training portion and a model validation portion, re-divides the new validation portion into a portion to be used to determine a set of link weights and separate portions to be used to determine each set of component weights, and modules 320, 330, 340, and 350 use the new portions to further update the set of component parameters and one or more of the sets of component and link weights in a manner described herein.

If application 300 determines that the model does not need further updates, application 300 configures the model using the trained set of component parameters, the first trained set of component weights, the trained set of link weights, and the second trained set of head component weights, and uses the trained model to perform the functionality for which the model was trained. In particular, when configuring and training an example generic model architecture for object detection, application 300 configures the model using the trained set of component parameters, the set of backbone component weights, the set of backbone link weights, and the set of head component weights, then uses the now configured and trained object detection model to perform object detection.

Figure 4:
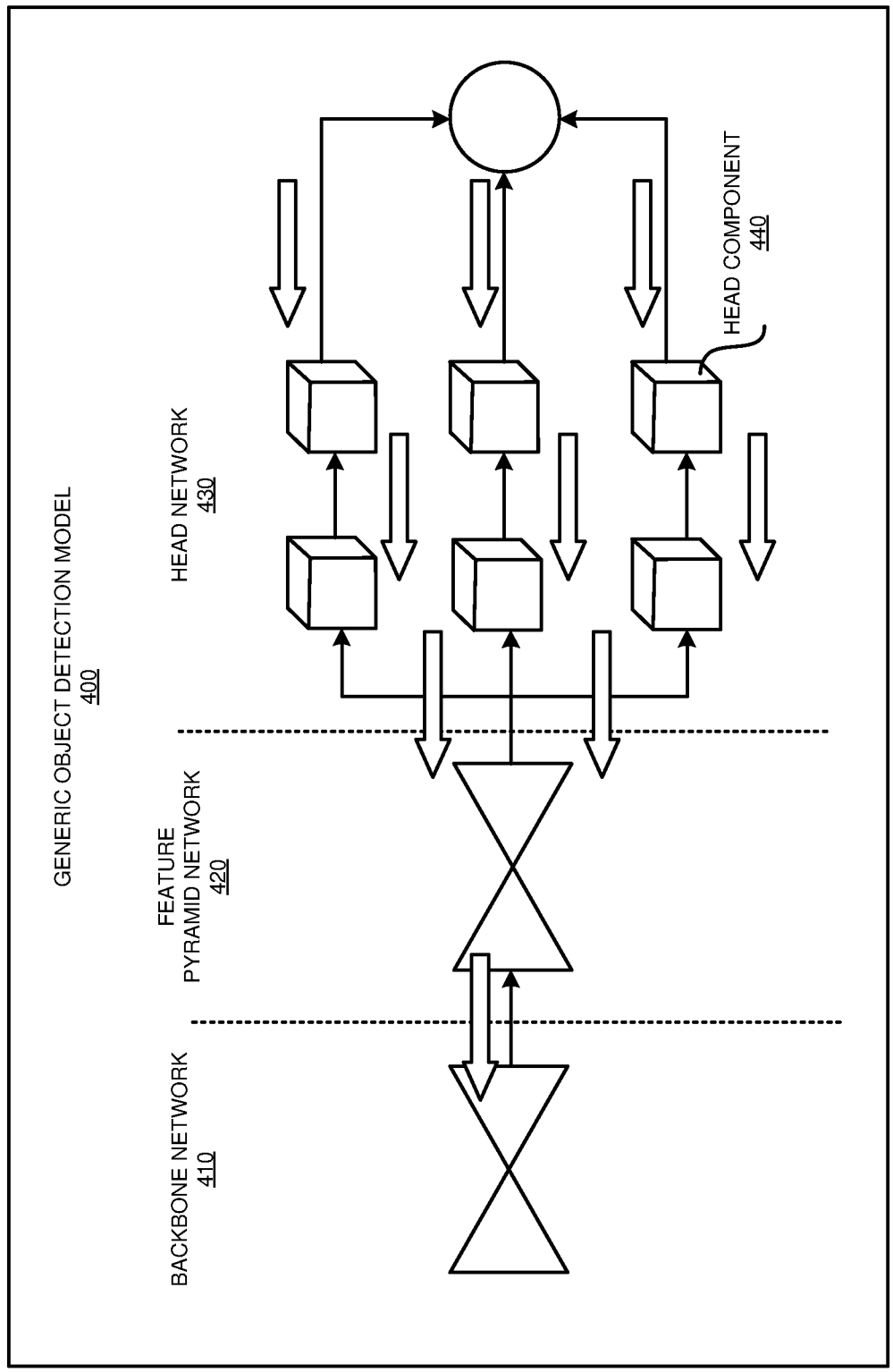
FIG. 4 depicts an example generic object detection model to be configured and trained using automated end-to-end machine learning model optimization in accordance with an illustrative embodiment.

With reference to FIG. 4, this figure depicts an example generic object detection model to be configured and trained using automated end-to-end machine learning model optimization in accordance with an illustrative embodiment. The model can be configured and trained using application 300 in FIG. 3.

In particular, FIG. 4 depicts generic object detection model 400, a generic model architecture for object detection within images. Model 400 has three main sections: backbone network 410, feature pyramid network 420, and head network 430. Head network 430 includes a set of head components, such as head component 440.

Figure 5:
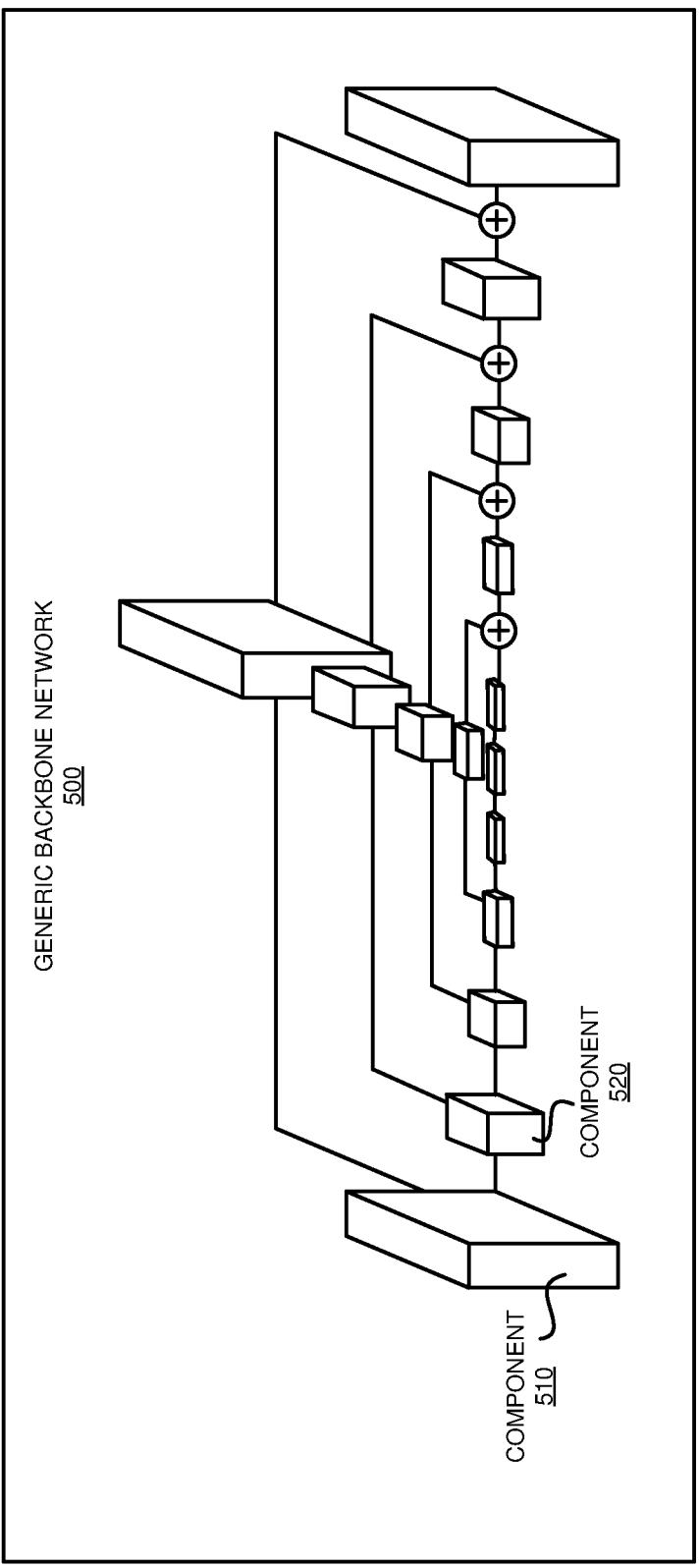
FIG. 5 depicts an example generic backbone network within an object detection model to be configured and trained using automated end-to-end machine learning model optimization in accordance with an illustrative embodiment.

With reference to FIG. 5, this figure depicts an example generic backbone network within an object detection model to be configured and trained using automated end-to-end machine learning model optimization in accordance with an illustrative embodiment. Generic backbone network 500 is an example configuration of backbone network 410 in FIG. 4, and can be configured and trained using application 300 in FIG. 3.

Generic backbone network 500 includes a set of backbone components, such as components 510 and 520. Network 500 is depicted in a u-net configuration. Each component in the u-net configuration has one or more possible types, for example a skip layer and one or more convolution layers of various sizes. Thus, each possible type for a particular backbone component has a corresponding backbone component weight.

Figure 6:
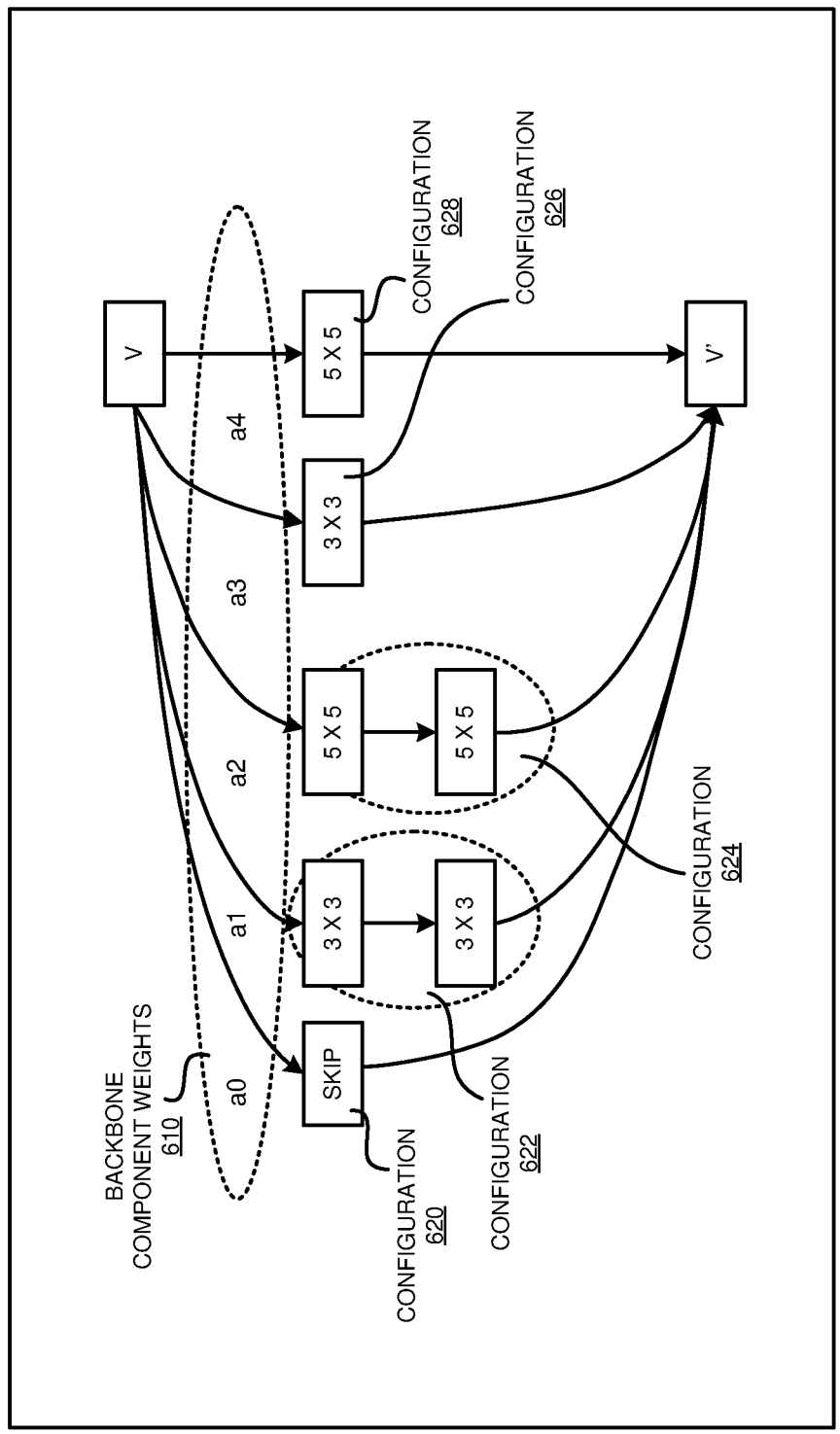
FIG. 6 depicts an example of automated end-to-end machine learning model optimization in accordance with an illustrative embodiment.

With reference to FIG. 6, this figure depicts an example of automated end-to-end machine learning model optimization in accordance with an illustrative embodiment. The example can be executed using application 300 in FIG. 3.

In particular, the example depicts configurations 620, 622, 624, 626, and 628. Each configuration is a possible type for a component (e.g. component 510) in backbone network 500 in FIG. 5. For example, configuration 620 is a skip layer, configuration 622 comprises two 3×3 convolution layers in series, configuration 624 comprises two 5.5 convolution layers in series, configuration 626 comprises one 3×3 convolution layer, and configuration 628 comprises one 5×5 convolution layer. Each configuration for a particular backbone component has a corresponding backbone component weight, depicted by backbone component weights 610. Backbone component weights 610 are initialized to suitable starting values and updated during configuration and training of the object detection model.

Figure 7:
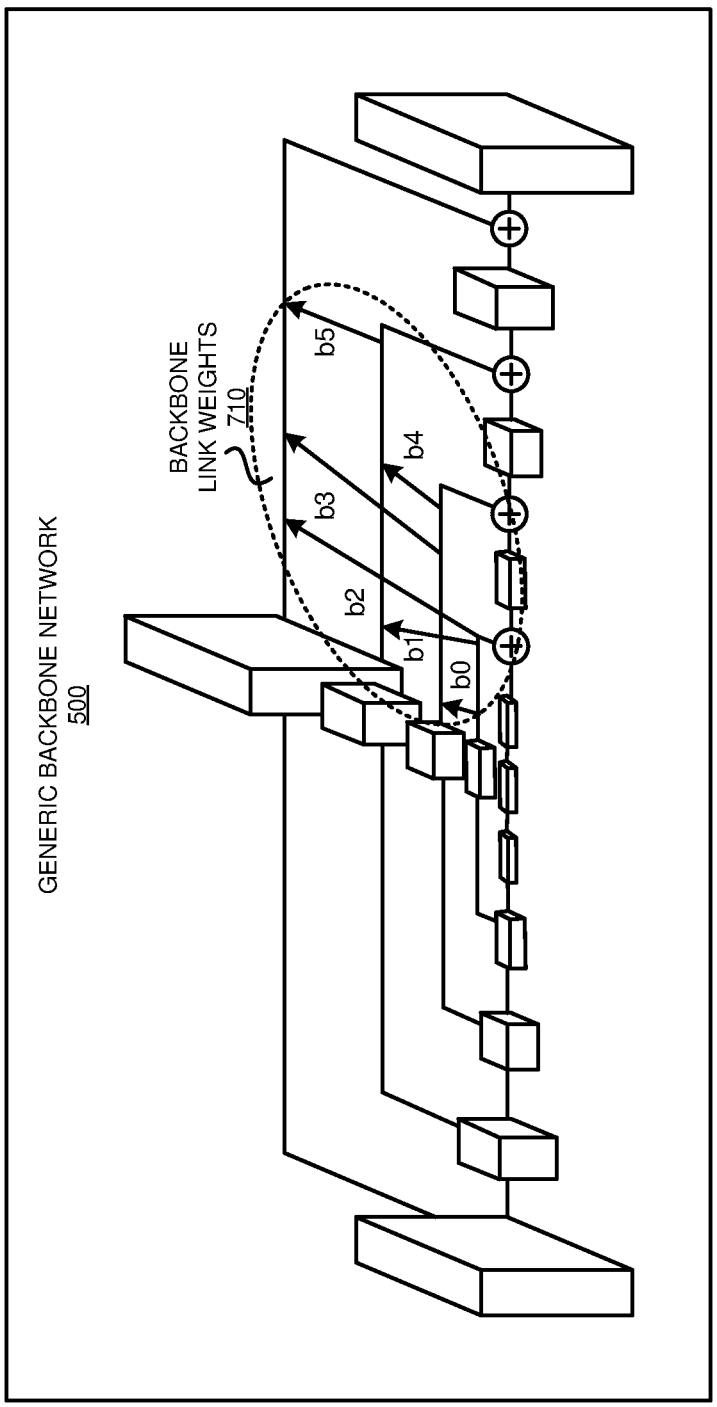
FIG. 7 depicts an example of automated end-to-end machine learning model optimization in accordance with an illustrative embodiment.

With reference to FIG. 7, this figure depicts an example of automated end-to-end machine learning model optimization in accordance with an illustrative embodiment. The example can be executed using application 300 in FIG. 3. Generic backbone network 500 is the same as generic backbone network 500 in FIG. 5.

Some links within the u-net configuration of network 500 are optional. These optional links within the u-net have corresponding backbone link weights 710. Backbone link weights 710 are initialized to suitable starting values and updated during configuration and training of the object detection model.

Figure 8:
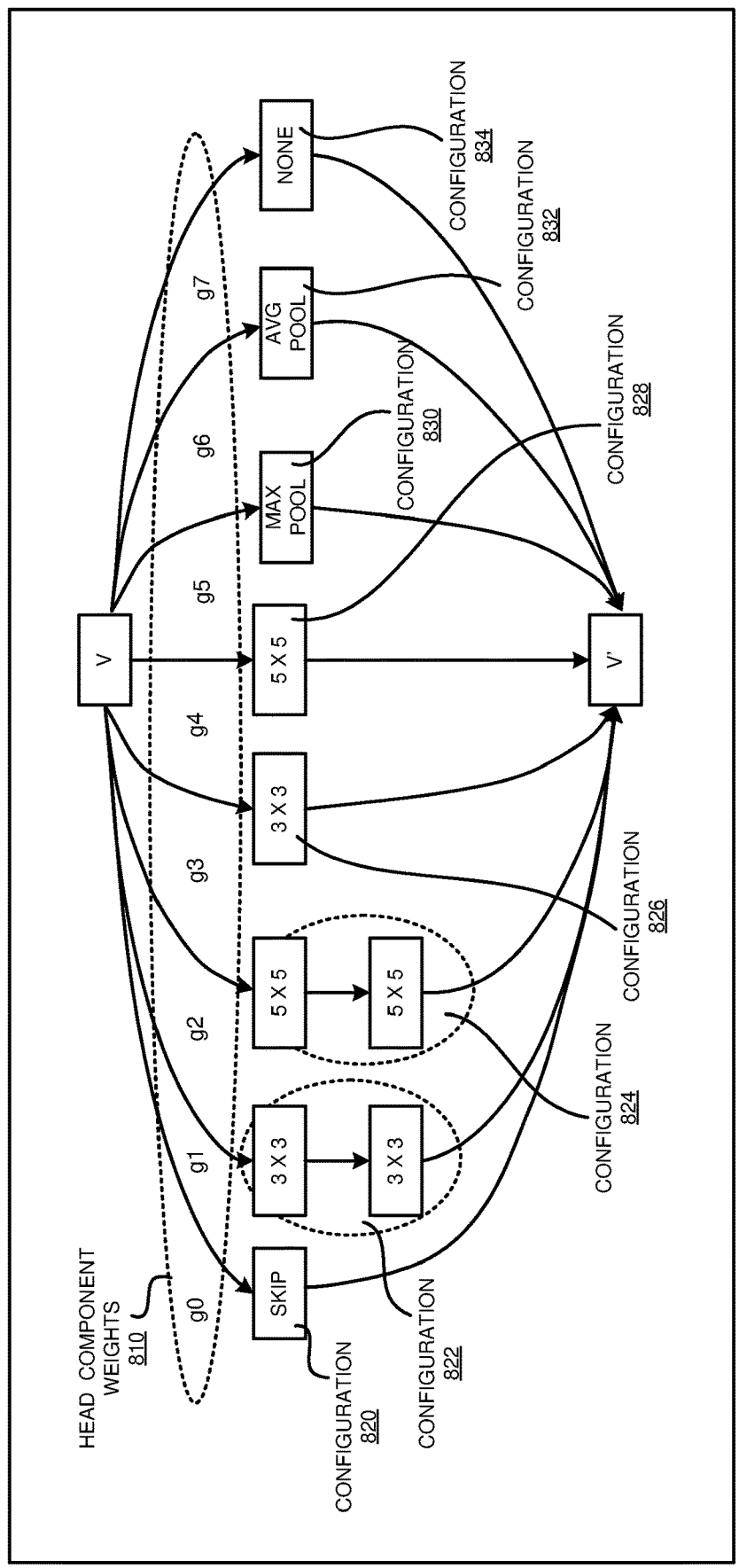
FIG. 8 depicts an example of automated end-to-end machine learning model optimization in accordance with an illustrative embodiment.

With reference to FIG. 8, this figure depicts an example of automated end-to-end machine learning model optimization in accordance with an illustrative embodiment. The example can be executed using application 300 in FIG. 3.

In particular, the example depicts configurations 820, 822, 824, 826, 828, 830, 832, and 834. Each configuration is a possible type for a component (e.g. head component 440) in head network 430 in FIG. 4. For example, configuration 820 is a skip layer, configuration 822 comprises two 3×3 convolution layers in series, configuration 824 comprises two 5.5 convolution layers in series, configuration 826 comprises one 3×3 convolution layer, configuration 828 comprises one 5×5 convolution layer, configuration 830 comprises one maximum pooling layer, configuration 832 comprises one average pooling layer, and configuration 834 does not include an operational layer. Each configuration for a particular head component has a corresponding head component weight, depicted by head component weights 810. Head component weights 810 are initialized to suitable starting values and updated during configuration and training of the object detection model.

Figure 9:
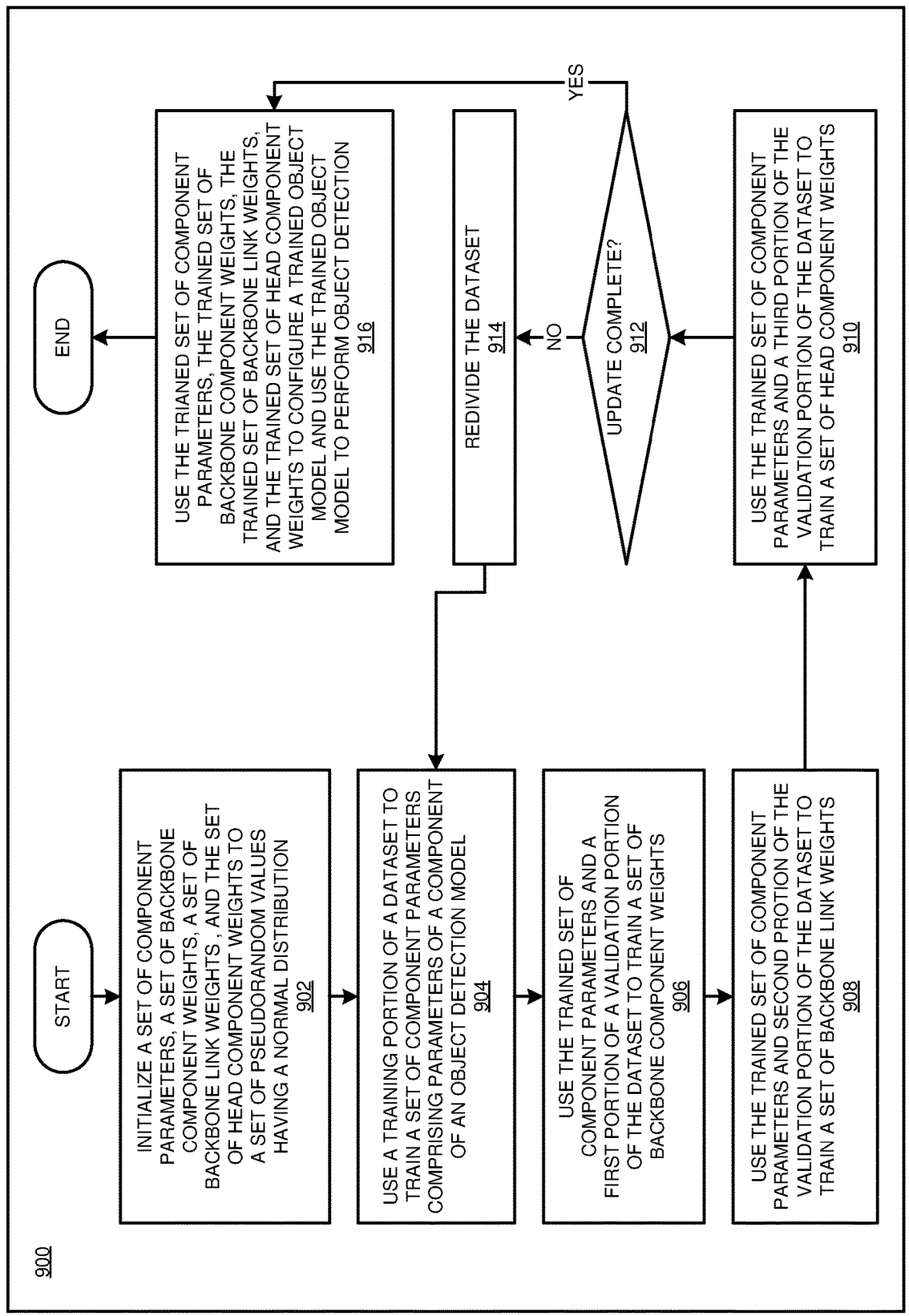
FIG. 9 depicts a flowchart of an example process for automated end-to-end machine learning model optimization in accordance with an illustrative embodiment.

With reference to FIG. 9, this figure depicts a flowchart of an example process for automated end-to-end machine learning model optimization in accordance with an illustrative embodiment. Process 900 can be implemented in application 300 in FIG. 3.

In block 902, the application initializes a set of component parameters, a set of backbone component weights, a set of backbone link weights, and the set of head component weights to a set of pseudorandom values having a normal distribution. In block 904, the application uses a training portion of a dataset to train a set of component parameters comprising parameters of a component of an object detection model. In block 906, the application uses the trained set of component parameters and a first portion of a validation portion of the dataset to train a set of backbone component weights. In block 908, the application uses the trained set of component parameters and a second portion of the validation portion of the dataset to train a set of backbone link weights. In block 910, the application uses the trained set of component parameters and a third portion of the validation portion of the dataset to train a set of head component weights. In block 912, the application checks whether updating is complete. If not ("NO" path of block 912), in block 914, the application re-divides the dataset and returns to block 904 to continue updating. If yes ("YES" path of block 912), in block 916 the application uses the trained set of component parameters, the trained set of backbone component weights, the trained set of backbone link weights, and the trained set of head component weights to configure a trained object model and used the trained object model to perform object detection. Then the application ends.

Figure 10:
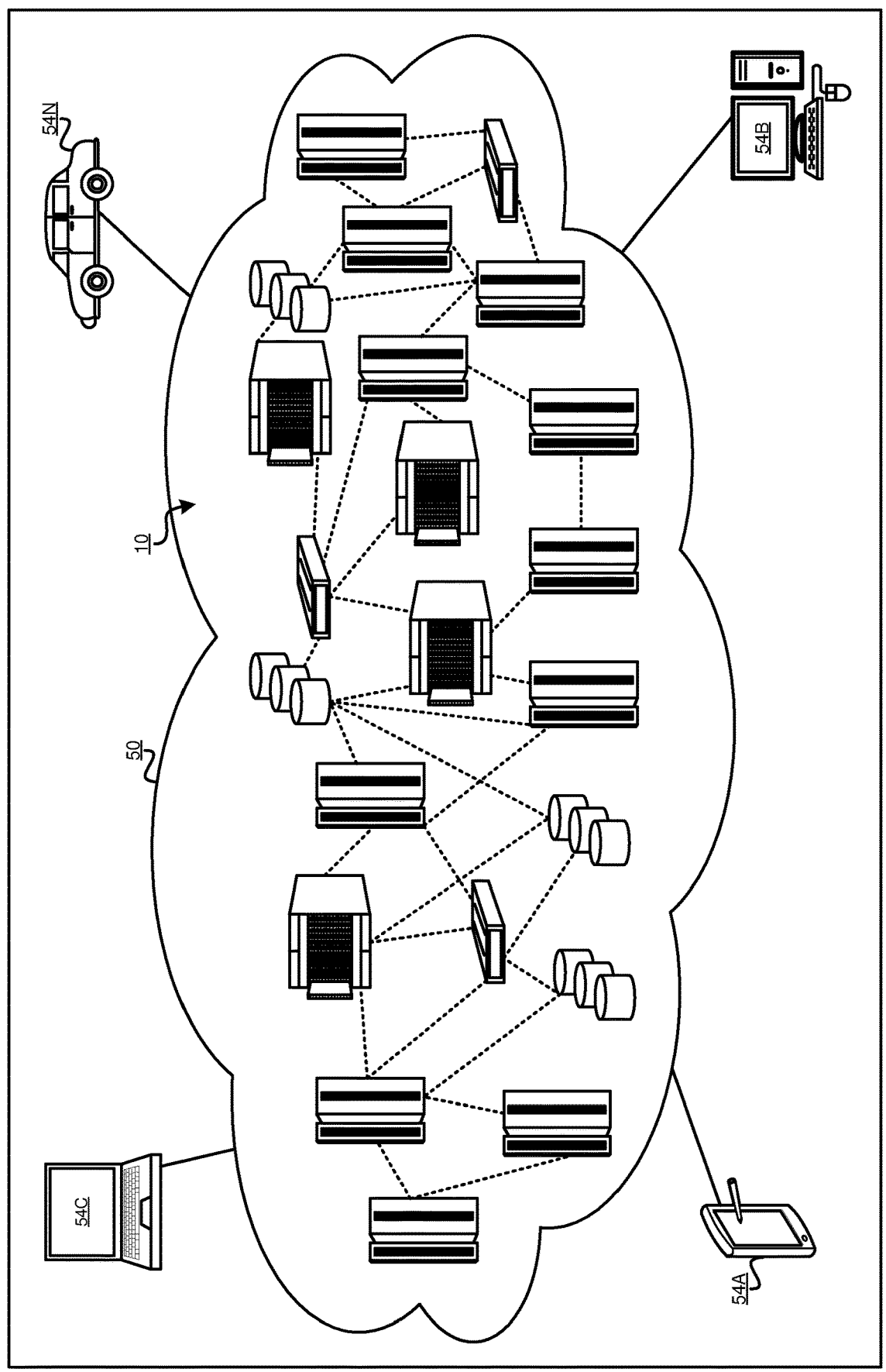
FIG. 10 depicts a cloud computing environment according to an embodiment of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 11:
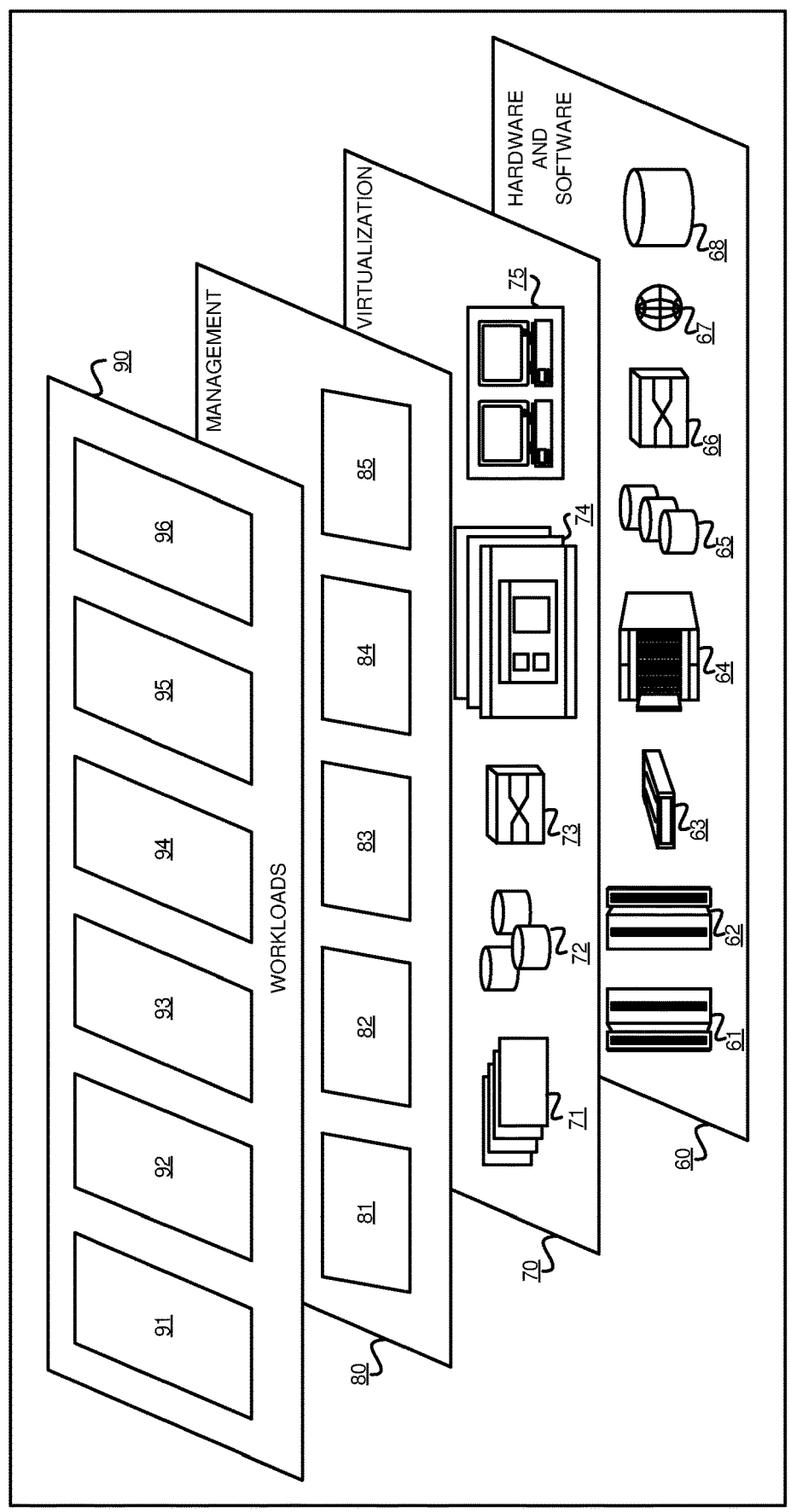
FIG. 11 depicts abstraction model layers according to an embodiment of the present invention.

Referring now to FIG. 11, a set of functional abstraction layers provided by cloud computing environment 50 (FIG. 10) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for automated end-to-end machine learning model optimization and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    dividing a dataset into a training portion and a validation portion, wherein the dataset is an initial dataset, and wherein the validation portion of the dataset is further divided into a first portion, a second portion, and a third portion;
    training, using the training portion of the dataset, a set of component parameters, the set of component parameters comprising parameters of a component of an object detection model;
    training, using the trained set of component parameters and the first portion of the validation portion of the dataset, a set of backbone component weights, wherein each backbone component weight in the set of backbone component weights corresponds to a possible backbone component type in a backbone portion of the object detection model;

training, using the trained set of component parameters and the second portion of the validation portion of the dataset, a set of backbone link weights, wherein each backbone link weight within the set of backbone link weights corresponds to a possible link between two backbone components within the backbone portion of in the object detection model;

training, using the trained set of component parameters and the third portion of the validation portion of the dataset, a set of head component weights, a head component weight in the set of head component weights comprising a weight of a component type in a head portion of the object detection model;

configuring, using the trained set of component parameters, the trained set of backbone component weights, the trained set of backbone link weights, and the trained set of head component weights, a trained object detection model;

causing the trained object detection model to perform object detection; and re-dividing the initial dataset into a second training portion and a second validation portion.

2. The computer-implemented method of claim 1, further comprising:

initializing, to a set of pseudorandom values having a normal distribution, the set of component parameters, the set of backbone component weights, the set of backbone link weights, and the set of head component weights.

3. The computer-implemented method of claim 1, wherein training the set of component parameters is performed using a stochastic training descent method.

4. The computer-implemented method of claim 1, wherein the trained set of component parameters, the set of backbone link weights, and the set of head component weights are held constant during training of the set of backbone component weights.

5. The computer-implemented method of claim 1, wherein the trained set of component parameters, the set of backbone component weights, and the set of head component weights are held constant during training of the set of backbone link weights.

6. The computer-implemented method of claim 1, wherein the trained set of component parameters, the set of backbone component weights, and the set of backbone link weights are held constant during training of the set of head component weights.

7. The computer-implemented method of claim 1, further comprising:

dividing the second validation portion into a fourth portion, a fifth portion, and a sixth portion;

retraining, using the second training portion, the trained set of component parameters;

retraining, using the fourth portion, the trained set of backbone component weights;

retraining, using the fifth portion, the trained set of backbone link weights; and retraining, using the sixth portion, the trained set of head component weights.

8. A computer program product for automated end-to-end machine learning model optimization, the computer program product comprising:

one or more computer readable storage media, and program instructions collectively stored on the one or more computer readable storage media, the program instructions comprising:

program instructions to divide a dataset into a training portion and a validation portion, wherein the dataset is an initial dataset, and wherein the validation portion of the dataset is further divided into a first portion, a second portion, and a third portion;

program instructions to train, using the training portion of the dataset, a set of component parameters, the set of component parameters comprising parameters of a component of an object detection model;

program instructions to train, using the trained set of component parameters and the first portion of the validation portion of the dataset, a set of backbone component weights, wherein each backbone component weight in the set of backbone component weights corresponds to a possible backbone component type in a backbone portion of the object detection model;

program instructions to train, using the trained set of component parameters and the second portion of the validation portion of the dataset, a set of backbone link weights, wherein each backbone link weight within the set of backbone link weights corresponds to a possible link between two backbone components within the backbone portion of in the object detection model;

program instructions to train, using the trained set of component parameters and the third portion of the validation portion of the dataset, a set of head component weights, a head component weight in the set of head component weights comprising a weight of a component type in a head portion of the object detection model;

program instructions to configure, using the trained set of component parameters, the trained set of backbone component weights, the trained set of backbone link weights, and the trained set of head component weights, a trained object detection model;

program instructions to causing the trained object detection model to perform object detection; and program instructions to re-divide the initial dataset into a second training portion and a second validation portion.

9. The computer program product of claim 8, further comprising:

program instructions to initialize, to a set of pseudorandom values having a normal distribution, the set of component parameters, the set of backbone component weights, the set of backbone link weights, and the set of head component weights.

10. The computer program product of claim 8, wherein training the set of component parameters is performed using a stochastic training descent method.

11. The computer program product of claim 8, wherein the trained set of component parameters, the set of backbone link weights, and the set of head component weights are held constant during training of the set of backbone component weights.

12. The computer program product of claim 8, wherein the trained set of component parameters, the set of backbone component weights, and the set of head component weights are held constant during training of the set of backbone link weights.

13. The computer program product of claim 8, wherein the trained set of component parameters, the set of backbone component weights, and the set of backbone link weights are held constant during training of the set of head component weights.

14. The computer program product of claim 8, further comprising:
program instructions to divide the dataset into a second training portion and a second validation portion;
program instructions to divide the second validation portion into a fourth portion, a fifth portion, and a sixth portion;
program instructions to retrain, using the second training portion, the trained set of component parameters;
program instructions to retrain, using the fourth portion, the trained set of backbone component weights;
program instructions to retrain, using the fifth portion, the trained set of backbone link weights; and
program instructions to retrain, using the sixth portion, the trained set of head component weights.

15. The computer program product of claim 8, wherein the stored program instructions are stored in the at least one of the one or more storage media of a local data processing system, and wherein the stored program instructions are transferred over a network from a remote data processing system.

16. The computer program product of claim 8, wherein the stored program instructions are stored in the at least one of the one or more storage media of a server data processing system, and wherein the stored program instructions are downloaded over a network to a remote data processing system for use in a computer readable storage device associated with the remote data processing system.

17. The computer program product of claim 8, wherein the computer program product is provided as a service in a cloud environment.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to divide a dataset into a training portion and a validation portion, wherein the dataset is an initial dataset, and wherein the validation portion of the dataset is further divided into a first portion, a second portion, and a third portion;
program instructions to train, using the training portion of the dataset, a set of component parameters, the set of component parameters comprising parameters of a component of an object detection model;
program instructions to train, using the trained set of component parameters and the first portion of the validation portion of the dataset, a set of backbone component weights, wherein each backbone component weight in the set of backbone component weights corresponds to a possible backbone component type in a backbone portion of the object detection model;
program instructions to train, using the trained set of component parameters and the second portion of the validation portion of the dataset, wherein each backbone link weight within the set of backbone link weights corresponds to a possible link between two backbone components within the backbone portion of in the object detection model;
program instructions to train, using the trained set of component parameters and the third portion of the validation portion of the dataset, a set of head component weights, a head component weight in the set of head component weights comprising a weight of a component type in a head portion of the object detection model;
program instructions to configure, using the trained set of component parameters, the trained set of backbone component weights, the trained set of backbone link weights, and the trained set of head component weights, a trained object detection model;
program instructions to causing the trained object detection model to perform object detection; and
program instructions to re-divide the initial dataset into a second training portion and a second validation portion.

19. The computer system of claim 18, further comprising:
program instructions to initialize, to a set of pseudorandom values having a normal distribution, the set of component parameters, the set of backbone component weights, the set of backbone link weights, and the set of head component weights.

20. The computer system of claim 19, wherein training the set of component parameters is performed using a stochastic training descent method.

* * * * *